(12) United States Patent
Weber

(10) Patent No.: US 11,524,391 B2
(45) Date of Patent: Dec. 13, 2022

(54) CLAMPING DEVICE WITH FORCE SENSING

(71) Applicant: Tory Weber, Calgary (CA)

(72) Inventor: Tory Weber, Calgary (CA)

( * ) Notice: Subject to any disclaimer, the term of this patent is extended or adjusted under 35 U.S.C. 154(b) by 0 days.

(21) Appl. No.: 17/263,213

(22) PCT Filed: Jul. 17, 2019

(86) PCT No.: PCT/CA2019/050988
§ 371 (c)(1),
(2) Date: Jan. 26, 2021

(87) PCT Pub. No.: WO2020/056490
PCT Pub. Date: Mar. 26, 2020

(65) Prior Publication Data
US 2021/0291321 A1    Sep. 23, 2021

Related U.S. Application Data

(60) Provisional application No. 62/802,795, filed on Feb. 8, 2019, provisional application No. 62/733,198, filed on Sep. 19, 2018.

(51) Int. Cl.
*B25B 5/06* (2006.01)
*B25B 5/16* (2006.01)
(Continued)

(52) U.S. Cl.
CPC .............. *B25B 5/16* (2013.01); *B25B 5/068* (2013.01); *G01L 5/009* (2013.01)

(58) Field of Classification Search
None
See application file for complete search history.

(56) References Cited

U.S. PATENT DOCUMENTS 5,183,055 A * 2/1993 Seager .................. A61B 5/107
600/587
6,474,632 B1 * 11/2002 Liou ....................... B25B 5/068
269/170

(Continued)

FOREIGN PATENT DOCUMENTS

| CN | 102554816 | | 7/2012 |
|---|---|---|---|
| CN | 102554816 A | * | 7/2012 |
| WO | 2005118224 | | 12/2005 |

*Primary Examiner* — Joseph J Hail
*Assistant Examiner* — Dana Lee Poon
(74) *Attorney, Agent, or Firm* — Ryan W. Dupuis; Kyle R. Satterthwaite; Ade & Company Inc.

(57) ABSTRACT

A clamp device has first and second jaws movable relative to one another for clamping an object therebetween. A clamp sensor operatively connected to one of the jaws generates a clamping signal representative of a clamping force urging the first and second jaws towards one another. A display is arranged to display a value proportional to the clamping signal which is representative of the clamping force between the first and second jaws. A motor for driving movement of the second jaw relative to the first jaw is operated by a controller that responds to operator commands in a manual control mode and/or which automatically drives the motor so as to maintain the clamping signal measured by the clamp sensor within a prescribed threshold range to apply a constant clamping force between the first and second jaws under an automated control mode.

20 Claims, 14 Drawing Sheets

(51) Int. Cl.
*F16B 2/12* (2006.01)
*G01L 5/00* (2006.01)

(56) References Cited

U.S. PATENT DOCUMENTS

| | | | | |
|---|---|---|---|---|
| 7,533,474 B2* | 5/2009 | Saito | ............ | G01B 3/205 |
| | | | | 33/783 |
| 7,735,814 B2* | 6/2010 | Ben-Gigi | ......... | B25B 5/068 |
| | | | | 269/6 |
| 2003/0047009 A1* | 3/2003 | Webb | ............ | G01B 3/205 |
| | | | | 73/862.541 |
| 2003/0217478 A1* | 11/2003 | Matsumiya | ...... | G01B 5/0014 |
| | | | | 33/784 |
| 2004/0140602 A1* | 7/2004 | Gerritsen | ........ | B25B 5/068 |
| | | | | 269/6 |
| 2007/0138724 A1 | 6/2007 | Gibbons et al. | | |
| 2009/0093910 A1* | 4/2009 | Grosz | ............ | G01B 3/002 |
| | | | | 700/275 |
| 2015/0246431 A1* | 9/2015 | Shute | ............ | B25B 5/163 |
| | | | | 144/195.4 |
| 2015/0282824 A1* | 10/2015 | Trees | ............ | A61B 18/1445 |
| | | | | 606/170 |

\* cited by examiner

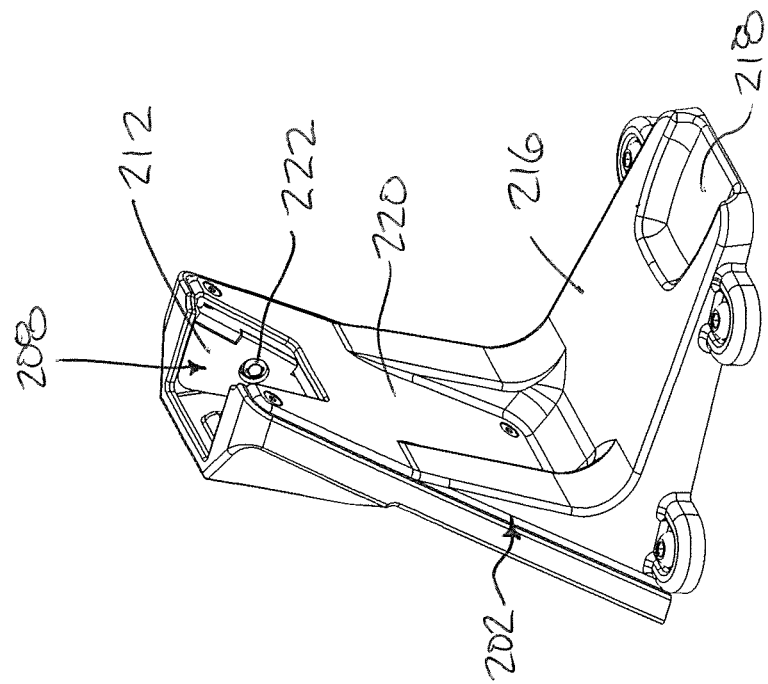
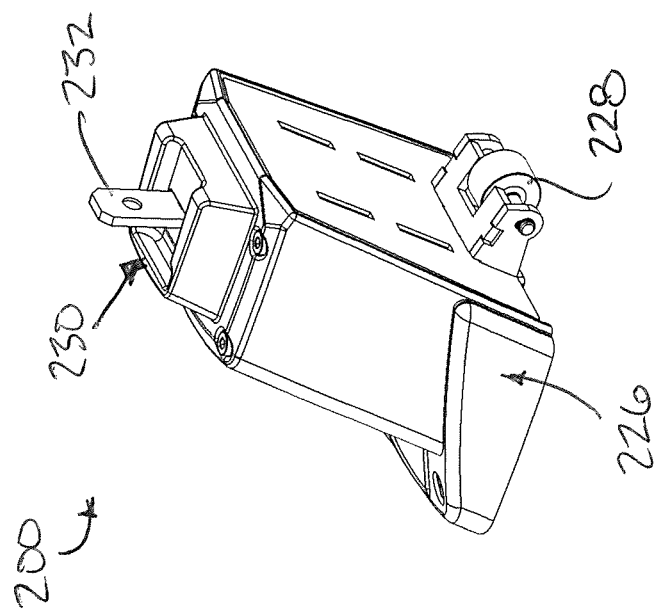
FIG-5

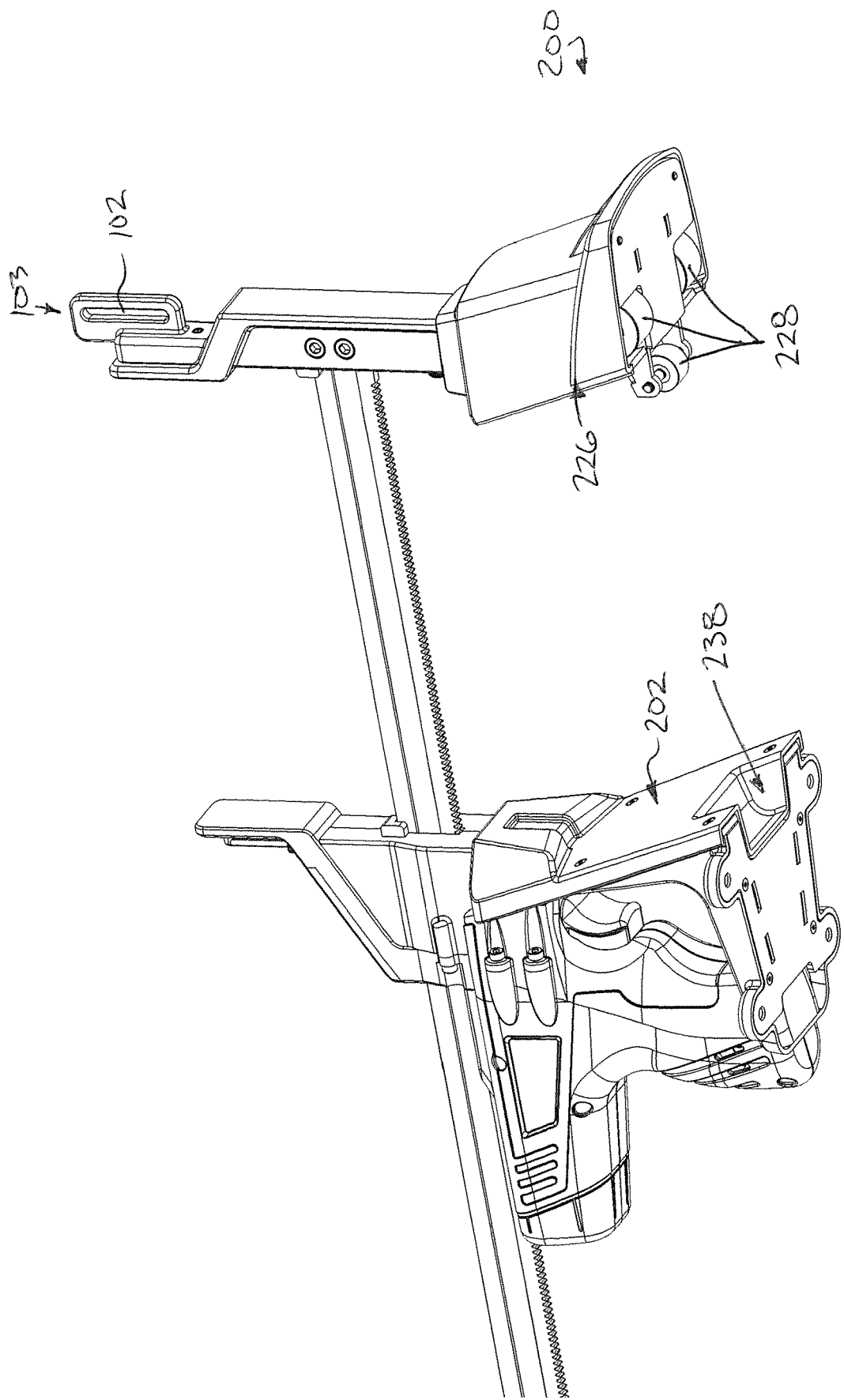

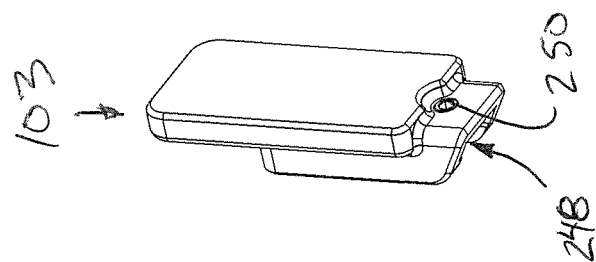
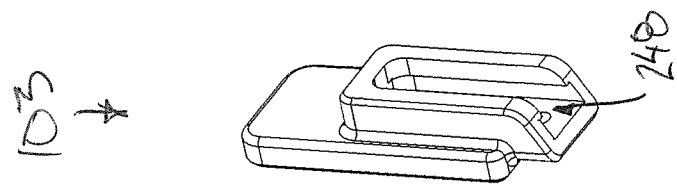
FIG. 8D

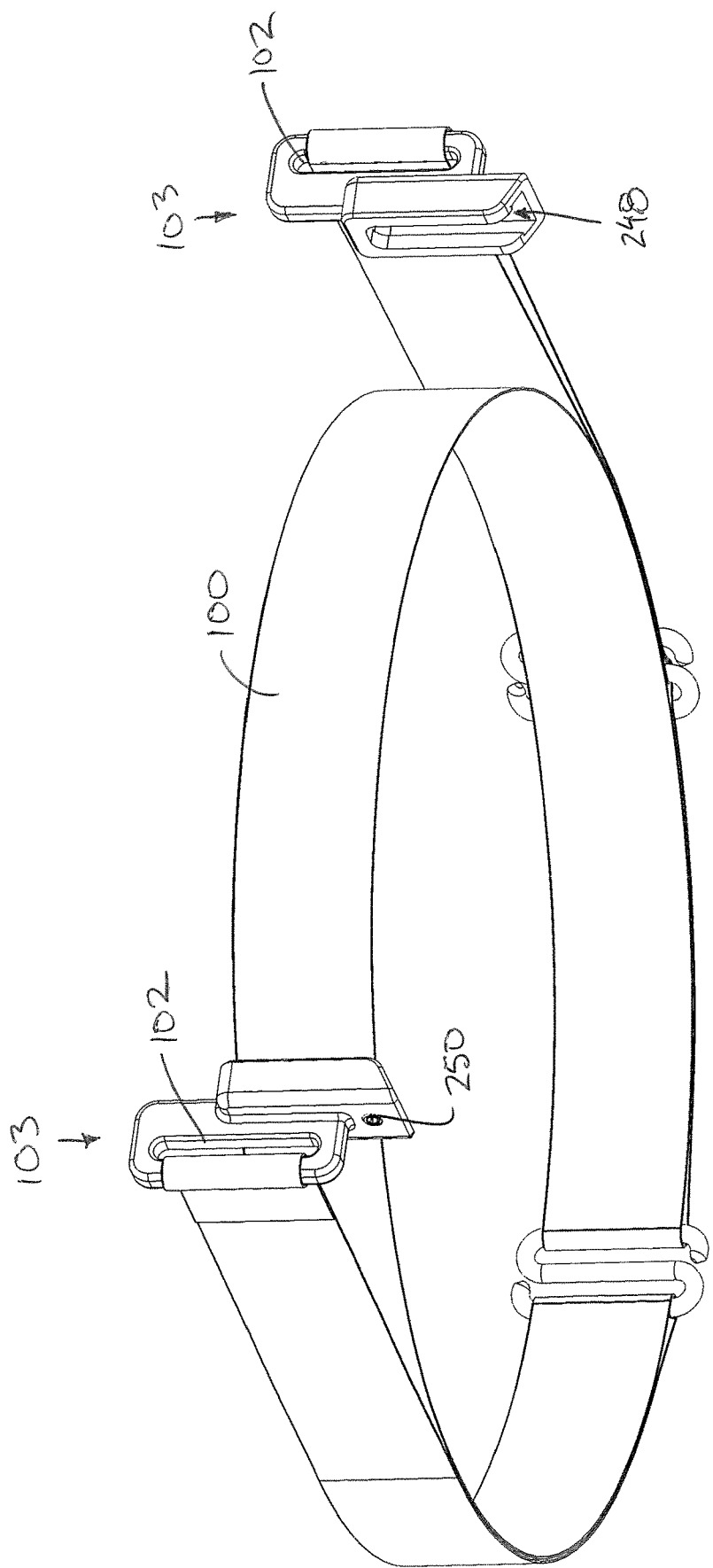

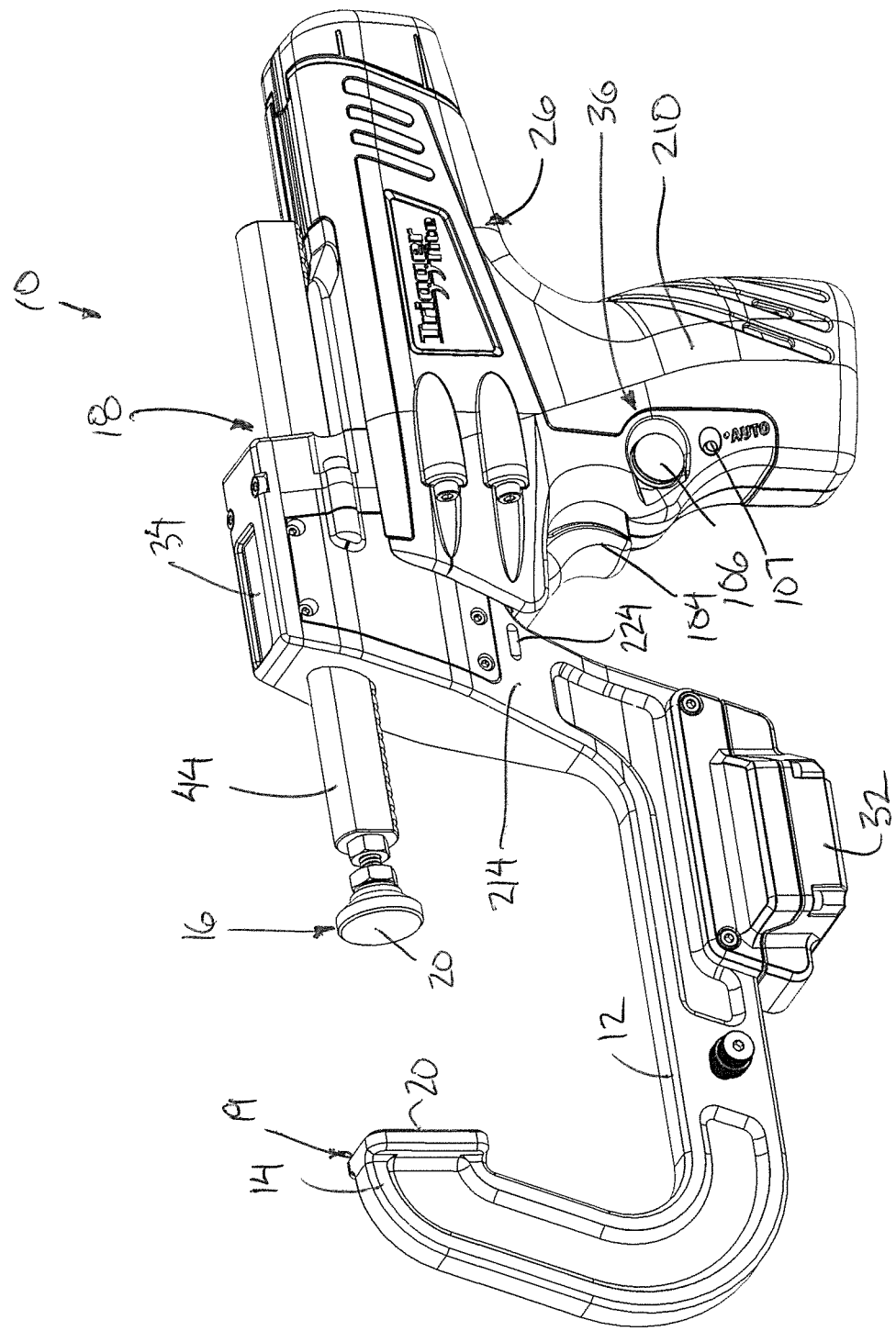

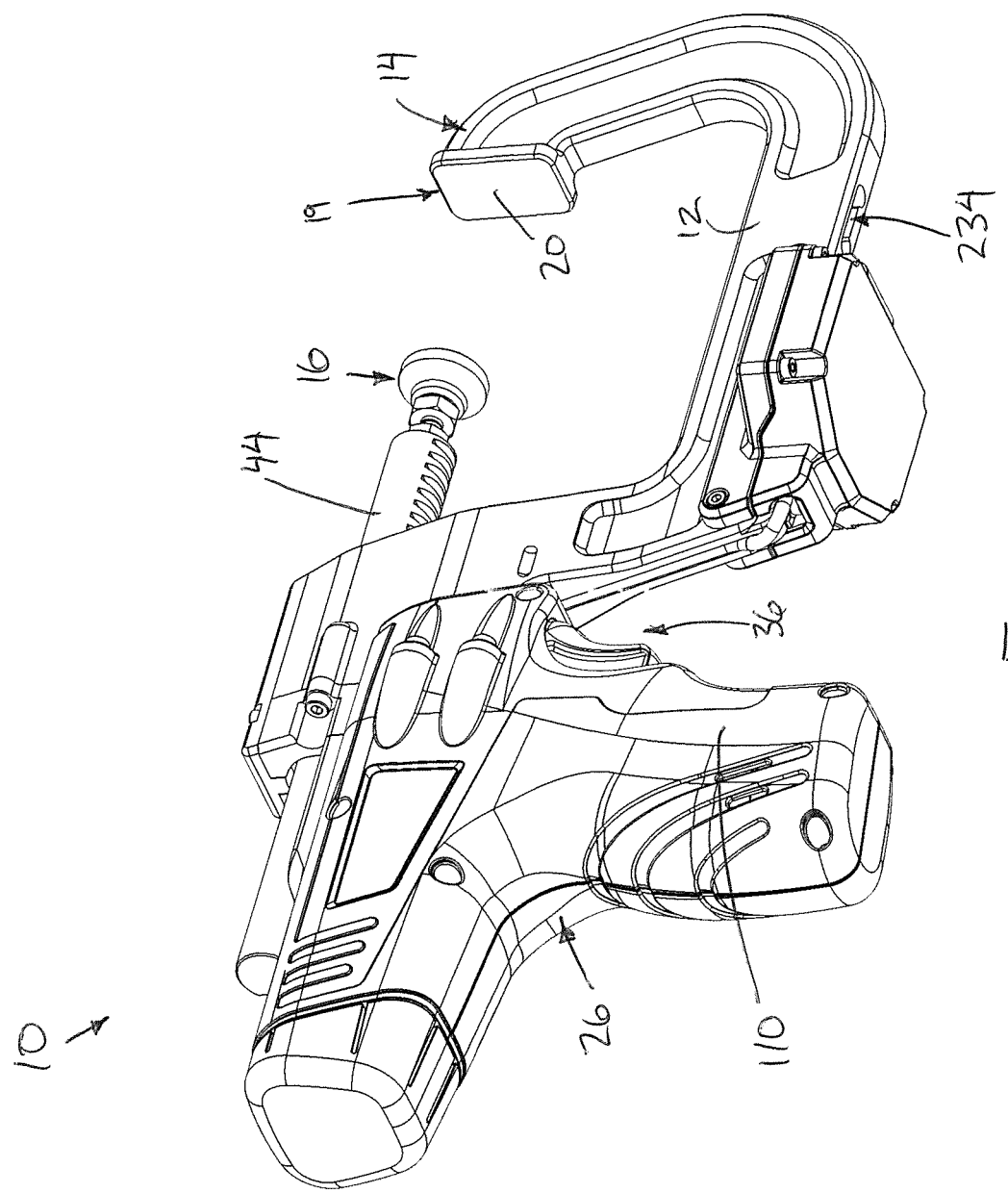

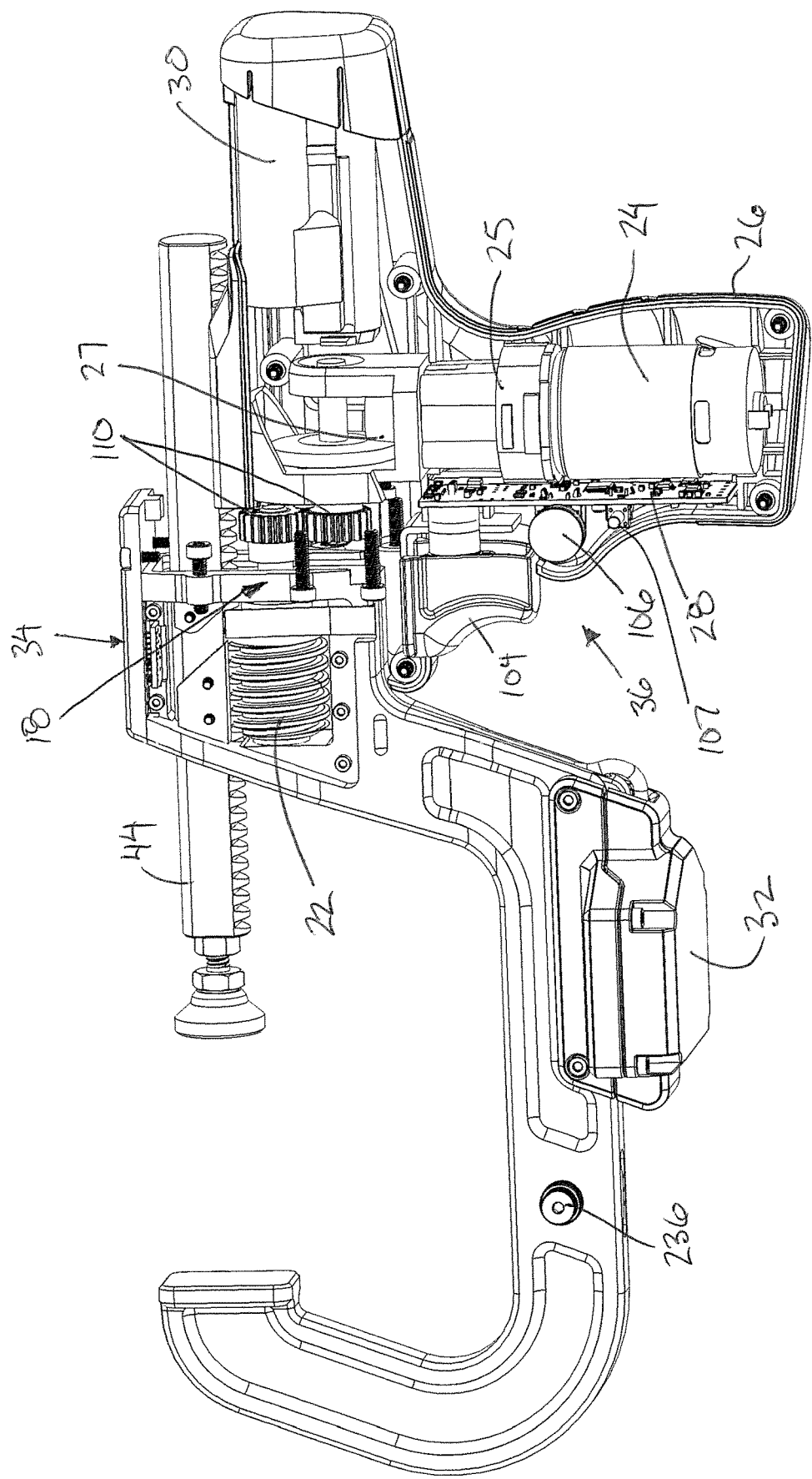

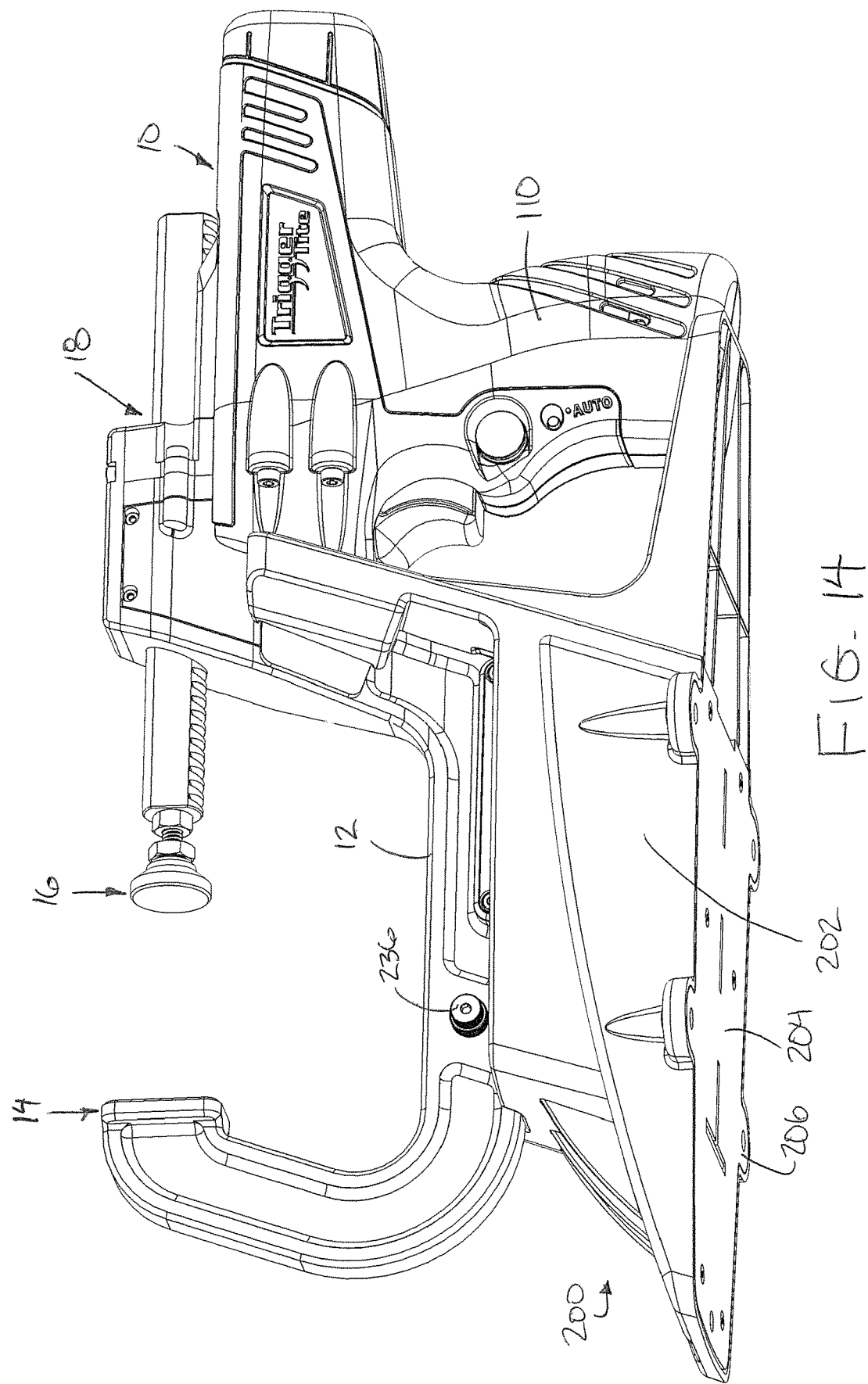

CLAMPING DEVICE WITH FORCE SENSING

FIELD OF THE INVENTION

The present invention relates to a clamp device comprising first and second jaws which are movable relative to one another for clamping an object therebetween or for spreading two objects apart, and more particularly the present invention relates to a clamp device including a clamp sensor for sensing a clamping force applied to an object that is clamped between the jaws of the clamp device.

BACKGROUND

Clamps are divided into 5 basic categories, bar clamps, sash clamps, T bar clamps, quick release bar clamps and C clamps. Bar, sash, T bar and quick release bar clamps are all long clamps typically ranging in size from 16" to 8' in length, C clamps tend to be smaller in nature with most sizes fitting between 1" and 12".

Clamps are used the world over both in industrial and consumer/handyman applications. Their primary function is to hold varying pieces of material in place while they are being worked on. Long clamps are primarily used in cases where the surface being clamped together is large and awkward for the user to hold, like a door or table, the clamps function is to span the distance of the work, it typically does this with a "flat steel or round bar" which houses gripping and tightening flanges at either end of the bar. The clamp is tightened or released with a crank which is fixed at one end of the clamp. The other flange at the other end of the bar is free floating and can be moved anywhere along the bar to accommodate the size of material being clamped.

The shortcomings with typical long clamps are that they can be awkward for the user during the tightening process. Usually the connection points where the components being clamped together need to stay in a very precise position and the slightest movement in the work during the tightening process can be displaced and cause the components to be clamped inaccurately. The tensioning crank on many bar clamps is bulky, awkward and in the way especially if the user is clamping objects on a flat working surface. In this case the whole body of work needs to be lifted each time the tensioning crank has to be rotated (because the tip of the handle when turned comes into contact with the table). This is time consuming and can cause the project to be out of alignment.

While working with long clamps they tend to be awkward, the pieces being clamped are usually large in nature and the user almost need "3 hands" to keep the work in alignment while clamping. The user many times needs to hold the clamp, and the project, then tighten the crank all at the same time making sure the item being clamped stays in alignment.

Adjusting bar clamps can be a frustration as the clamp only has as limited amount of travel or stroke. This is the distance of the torsion adjustment screw. This length is typically a few inches and may have to be reset because there is not enough travel with the adjustment screw attached to the torsion crank that tightens the work. In this case the clamp has to be undone, the torsion screw cranked back all the way and then the grip flange at the other end of the clamp needs to be reset and moved closer to the work.

Ratchet style clamps are the latest innovation in the bar clamp industry and they offer the user some more functionality but one of the major deficiencies with this type of clamp is when it comes to de-tensioning the unit. The user has to hit a quick release button to detention the clamp which causes the clamp to jump when the tension is released. This violent action can be enough to pop delicate glue joints or cause the work to become misaligned. In many applications the user needs to tension and de-tension the unit slowly and carefully while aligning the work in just the perfect position, something ratchet style clamps do not allow.

SUMMARY OF THE INVENTION

According to one aspect of the invention there is provided a clamp device comprising:
  a rail member which is elongate in a longitudinal direction;
  a first jaw adapted to be mounted on the rail member in fixed relation to the rail member;
  a second jaw;
  a clamp assembly supporting the second jaw on the rail member such that the second jaw is movable along the rail member in the longitudinal direction relative to the first jaw for clamping an object between the first and second jaws;
  a clamp sensor operatively connected to one of the jaws so as to generate a clamping signal representative of a clamping force urging the first and second jaws towards one another; and
  a display supported on the clamp device and which is operatively connected to the clamp sensor so as to be arranged to display a value proportional to the clamping signal which is representative of the damping force between the first and second jaws.

According to a second aspect of the present invention there is provided a clamp device comprising:
  a rail member which is elongate in a longitudinal direction;
  a first jaw adapted to be mounted on the rail member in fixed relation to the rail member;
  a second jaw;
  a clamp assembly supporting the second jaw on the rail member such that the second jaw is movable along the rail member in the longitudinal direction relative to the first jaw for clamping an object between the first and second jaws;
  a clamp sensor operatively connected to one of the jaws so as to generate a clamping signal representative of a clamping force urging the first and second jaws towards one another;
  a motor operatively connected to the clamp assembly so as to be arranged to drive movement of the second jaw in the longitudinal direction relative to the rail member; and
  a controller operatively connected to the clamp sensor and the motor, the controller including a processor and programming stored thereon which is executable by the processor so as to be arranged to operate the motor to displace the second jaw relative to the first jaw so as to maintain the clamping signal measured by the clamp sensor within a prescribed threshold range to apply a constant clamping force between the first and second jaws.

According to another aspect of the present invention there is provided a clamp device comprising:
  a rail member which is elongate in a longitudinal direction;
  a first jaw adapted to be mounted on the rail member in fixed relation to the rail member;

a second jaw;

a clamp assembly supporting the second jaw on the rail member such that the second jaw is movable along the rail member in the longitudinal direction relative to the first jaw for clamping an object between the first and second jaws;

a motor operatively connected to the clamp assembly so as to be arranged to drive movement of the second jaw in the longitudinal direction relative to the rail member;

a controller operatively connected to the motor, the controller including an operative input, a processor and a memory storing programming thereon which is executable by the processor so as to be arranged to operate the motor to displace the second jaw relative to the first jaw in response to input from an operator through the operator input; and a docking station having:
  a base which is adapted to be secured to a supporting surface in fixed relation therewith; and
  a receiving portion which releasably mates with a portion of the clamp device such that one of the first and second jaws is held in fixed relation to the base.

Another important independent aspect of the present invention which may be used in combination with any aspect of the invention noted above or below includes, the device including a motor operatively connected to the clamp assembly so as to be arranged to drive movement of the second jaw in the longitudinal direction relative to the rail member and a controller having an operator input supported on the clamp assembly for operating the motor.

Another important independent aspect of the present invention which may be used in combination with any aspect of the invention noted above or below includes the motor being operative to drive movement of the second jaw in either one of two opposing directions along the rail member.

Another important independent aspect of the present invention which may be used in combination with any aspect of the invention noted above or below includes a motor being operatively connected to the clamp assembly so as to be arranged to drive movement of the second jaw in the longitudinal direction relative to the rail member, and a controller including a processor and programming stored thereon which is executable by the processor so as to be arranged to operate the motor to displace the second jaw relative to the first jaw so as to apply a constant clamping force between the first and second jaws in an automatic mode of operation.

Another important independent aspect of the present invention which may be used in combination with any aspect of the invention noted above or below includes the controller being arranged to measure the clamping signal at prescribed intervals and control the motor to adjust the position of the second jaw relative to the first jaw to maintain the clamping force at a prescribed set point force stored on the controller subsequent to each measurement of the clamping signal.

Another important independent aspect of the present invention which may be used in combination with any aspect of the invention noted above or below includes the prescribed set point force stored on the controller is a threshold range stored thereon and wherein the controller is arranged to execute the programming so as to adjust the position of the second jaw relative to the first jaw only if the clamping force sensed by the clamp sensor is outside of the threshold range. The prescribed set point force may be programmably adjustable.

Another important independent aspect of the present invention which may be used in combination with any aspect of the invention noted above or below includes the controller including at least one drive input operable to activate the motor to displace the jaws relative to one another to vary a current clamping force applied by the jaws in a manual mode of operation and a mode selection input operable to activate the automatic mode of operation and set the current clamping force as the prescribed set point force when activated.

Another important independent aspect of the present invention which may be used in combination with any aspect of the invention noted above or below includes the prescribed intervals being in sequence such that the controller is arranged to continuously measure the clamping signal.

Another important independent aspect of the present invention which may be used in combination with any aspect of the invention noted above or below includes the prescribed intervals being spaced apart in duration from one another.

Another important independent aspect of the present invention which may be used in combination with any aspect of the invention noted above or below includes the clamp sensor being further operative to generate a spreading signal representative of a spreading force urging the first and second jaws away from one another.

Another important independent aspect of the present invention which may be used in combination with any aspect of the invention noted above or below includes the clamp assembly comprising a screw which is operatively connected to the motor for driving movement of the second jaw relative to the first jaw.

Another important independent aspect of the present invention which may be used in combination with any aspect of the invention noted above or below includes a rack of teeth along the rail member with which the screw is operatively connected for driving movement of the second jaw relative to the first jaw.

Another important independent aspect of the present invention which may be used in combination with any aspect of the invention noted above or below includes the clamp assembly further comprising a spur gear operatively connecting the screw to the rack of teeth.

Another important independent aspect of the present invention which may be used in combination with any aspect of the invention noted above or below includes the clamp sensor being provided on a face of one of the jaws.

Another important independent aspect of the present invention which may be used in combination with any aspect of the invention noted above or below includes the clamp sensor comprising a strain gauge operatively connected to one of the jaws.

Another important independent aspect of the present invention which may be used in combination with any aspect of the invention noted above or below includes a docking station having a base which is adapted to be secured to a supporting surface in fixed relation therewith and a receiving portion which releasably mates with a portion of the clamp device such that one of the first and second jaws is held in fixed relation to the base.

Another important independent aspect of the present invention which may be used in combination with any aspect of the invention noted above or below includes the clamp device comprising a bar clamp in which the second jaw is adapted to be coupled in fixed relation to the base such that the first jaw and the rail member are movable relative to the base, and wherein the docking station further comprises a carriage member adapted to be mounted in fixed relation to the first jaw and which is supported for rolling movement along the supporting surface that supports the base in fixed relation thereon.

Another important independent aspect of the present invention which may be used in combination with any aspect of the invention noted above or below includes a first clamping head supported on the first jaw and a second clamping head supported on the second jaw so as to define respective clamping faces of the first and second jaws which clamp an object therebetween, the first and second clamping heads being mounted on the jaws so as to be interchangeable with auxiliary clamping heads having respective clamping faces which are different in configuration than the clamping faces of the first and second clamping heads.

Another important independent aspect of the present invention which may be used in combination with any aspect of the invention noted above or below includes a first clamping head supported on the first jaw and a second clamping head supported on the second jaw so as to define respective clamping faces of the first and second jaws which clamp an object therebetween, the first and second clamping heads being adjustably mounted on the jaws so as allow variation of a distance of the clamping faces relative to the rail member in a direction transverse to the longitudinal direction.

Another important independent aspect of the present invention which may be used in combination with any aspect of the invention noted above or below includes the clamp device including a second sensor operatively connected to the controller so as to generate a spreading signal representative of a spreading force urging the first and second jaws away from one another and wherein the controller is arranged to operate the motor to displace the second jaw relative to the first jaw so as to maintain the spreading signal measured by the clamp sensor within a prescribed threshold range to apply a constant spreading force between the first and second jaws.

In thinking of how to overcome the shortcomings of standard long clamps it was determined that if the user could hold onto the work and tighten and loosen the clamps without moving their hands to crank the tension dial this would give the user much greater control and accuracy during the clamping process. This can be accomplished by mechanizing the clamps into cordless battery operated tools, giving the user the ability to open or close the clamp by simply squeezing a trigger located on the handle on the clamp itself.

The innovation makes standard traditional clamps "cordless tools" creating an entire new tool category.

The new technology clamps would tighten and loosen with unlimited travel, meaning the jaw of the clamp can travel the entire length of the bar if need be. This overcomes a big frustration in working with typical long clamps with respect to the limited travel on the adjustment screw.

These clamps have the ability to create significant amounts of torque, and can be manufactured in light, medium and heavy duty categories from 5-50 (but not limited to) foot pounds. This torque is created through a reliable worm gear drive mechanism.

Another benefit for the user is that there is a visible digital torque gauge, this will help the user determine the amount of force that is being applied during the clamping process. This is a very helpful aid for the user in terms of not over tightening the work. There is also an opportunity for growth in terms of driving sales based on this feature as manufacturers could specify what amount of force should be applied during the installation process. One example is during assembly of unfinished furniture in particular chairs where a great number of parts are tapered and fitted into holes. Because the components are tapered if they are over tightened the parts can expand the hole like a wedge and crack the piece. The manufacturer can now state a clamping force during assembly reducing the amount of consumer returns.

Another advantage is having the ability of putting even clamping pressure in opposing directions, this is important for example when clamping picture frames, if there is too much pressure being applied in one direction over another (90 degrees to each other) the part being clamped can warp once the clamps are disengaged.

Still one of the biggest features of this new technology is being able to set and maintain steady clamping pressure. Because the system is digital it can make unattended adjustment based on the users settings. This feature is helpful in a number of scenarios, for example when materials dry they tend to shrink and therefore the clamping pressure becomes less throughout the process. In many cases the clamp can become entirely disengaged over a period of time. With the new clamp having the ability to maintain a suggested pressure it can "tighten" the clamp throughout the drying process maintaining the constant assigned pressure.

A secondary application for this clamp technology is it can operate in reverse as a spreader. The ability to apply a significant force in the opposite direction of the typical clamping "squeeze" motion is beneficial. Not only can the unit spread open to hold items such as door jambs in place in can be used to spread items apart during construction like 2×4 studs that may not be vertically level.

The cordless torque driven by the unit will enable the user to put tension into openings—for example hold door jambs and window frames in place during installation, or spreading wall studs etc. It is virtually limitless in terms of its use and will increase the perceived value considerably without adding production cost.

C Clamps although much smaller and different in configuration they share the same common problems associated with clamping. In particular it is difficult for the user to hold the item being clamped into place while tightening the handle, the item quite often shifts out of place during this process. The advent of a cordless C Clamp that is trigger activated allows the user to open and close the clamp quickly without a lot of unnecessary motion offers a distinct advantage over traditional C Clamps. The ability for the clamp to make unattended adjustments to maintain consistent clamping pressure like in the bar clamp is a major benefit of this C Clamp design.

BRIEF DESCRIPTION OF THE DRAWINGS

Some embodiments of the invention will now be described in conjunction with the accompanying drawings in which:

FIG. 5 is a perspective view of a docking station for the clamp device according to the first embodiment of FIG. 1.

FIGS. 6 and 7 are perspective views of the clamp device supported within the docking station according to the first embodiment of FIG. 1.

FIGS. 8 and 9 are perspective views of alternative clamping heads which can be supported on the first and second jaws of the clamp device according to the first embodiment of FIG. 1.

FIG. 10 is a perspective view of a second embodiment of the clamp device.

FIG. 11 is an additional perspective view of the clamp device according to the second embodiment of FIG. 9.

FIG. 12 is a partly sectional view of the clamp assembly of the clamp device according to the second embodiment of FIG. 9.

FIG. 14 is a perspective view of the clamp device supported within the docking station according to the second embodiment of FIG. 9.

In the drawings like characters of reference indicate corresponding parts in the different figures.

DETAILED DESCRIPTION

Figure 1:
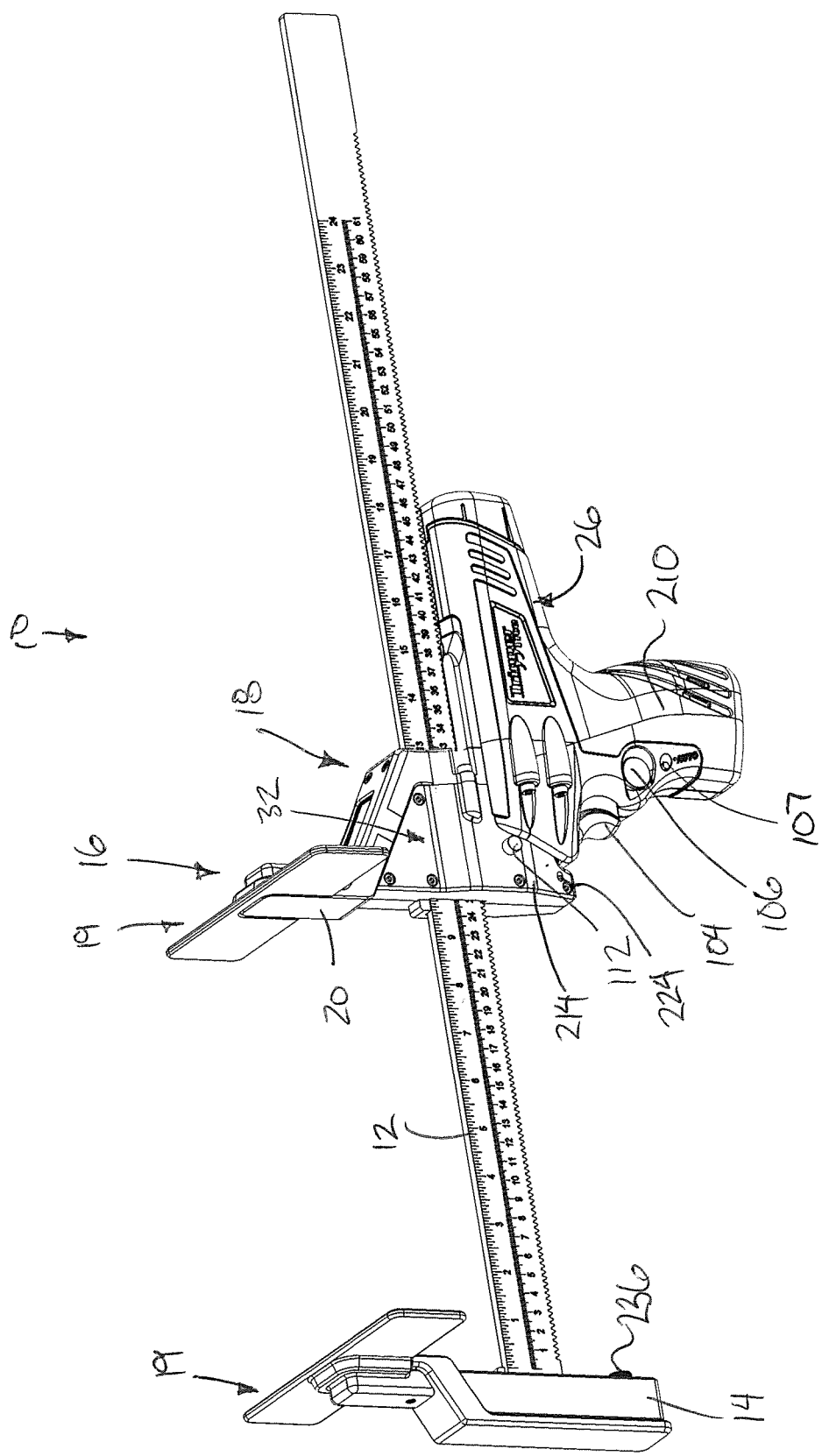
FIG. 1 is a perspective view of a first embodiment of the clamp device.

Referring to the accompanying figures there is illustrated a clamp device generally indicated by reference numeral 10. The features in common to the various embodiments of the clamp device 10 shown in the figures will now be described in further detail.

The clamp device 10 generally includes a rail member 12 which is elongate in a longitudinal direction between opposing first and second ends.

A first jaw 14 is mounted on the first end of the rail to protrude transversely outward from the rail. The first jaw 14 is mounted in fixed relation to the rail member 12.

A second jaw 16 is supported on the rail member 12 by a suitable clamp assembly 18 such that the second jaw similarly protrudes transversely outward from the rail member while also being supported for longitudinal sliding movement along the rail member relative to the first jaw. The first and second jaws each include a clamping head 19 supported thereon which defines an interior clamping face 20 formed thereon such that the clamping faces are parallel and confront one another for clamping an object therebetween.

The clamping heads 19 are preferably mounted on the jaws so as to be readily releasable and/or adjustable in position and/or orientation relative to the jaws. For example, in one instance, the clamping heads can be removed from the jaws and replaced with auxiliary clamping heads which are different in configuration. In some instances, the clamping faces are different in size and orientation relative to one another so as to allow the clamping surface is defined on the clamping heads to be matched to the object being clamped. In other instances, the clamping heads may be oriented so as to be reversible in orientation so that the clamping faces are reoriented from a clamping configuration to a spreading configuration.

In yet further instances, the clamping heads may be adjustable along the respective jaws in a direction which is perpendicular to the longitudinal axis of the rail member so as to vary the distance of the clamping faces relative to the rail member. When using two clamp devices 10 for clamping in perpendicular directions relative to one another on the same object, the two clamp devices can be oriented for clamping within the same horizontal plane in perpendicular directions by mounting the clamping heads on one clamp device at a first distance and mounting the clamping heads on the other clamp device at a second distance so that the rail members are perpendicular to one another but lie in spaced apart planes at different distances to the clamping plane of the clamping heads. Accordingly, when the need arises where the user needs to use more than one clamp in opposing directions so that the rail members of conventional clamps would interfere with one another, the clamp devices 10 according to the present invention provides a solution that allows two clamps to clamp perpendicularly to one another within the same plane without interference of the rail members instead of conventional clamps which interfere with one another and can cause one side of the work to be out of square during the clamping process because the work is not being tightened on the same plane. By having the clamping heads of the jaws of the clamp have the ability to extend out lengthening the travel of the jaw the clamp can now bridge or go over top of the other clamp when used in opposing directions.

The clamping heads also have slots designed into them that allow for other useful attachments to be added such as a long L bracket that can cradle the work over a longer surface area. This is helpful when there is limited space for multiple clamps but a wider area needs to be secured. As shown in FIG. 9, a strap 100 can be connected at opposing ends within the slots 102 in the alternative clamping heads 103 so that the strap can extend circumferentially about an object to be clamped. In this instance, displacing the clamping heads towards one another in a clamping configuration constricts the overall circumference of the strap about an object being clamped.

The clamping surfaces of the clamping heads can be fitted with a consumable felt tip to protect delicate pieces of work where typical clamps can leave impressions from the clamp jaws.

The clamp assembly 18 typically includes a screw member 22 operatively connected to the rotary output of a suitable motor 24 which is supported within a housing 26 carried on the rail member. The output of the motor 24 is initially connected to a planetary gear set 25 which in turn has an output that drives the screw 22 of the clamp assembly. When the motor and planetary gear set are rotatable about axes that extend radially outward in relation to the longitudinal axis of sliding of the jaws, an additional set of right-angle gears 27 are coupled between the output of the planetary gear set and the input of the screw 22 that is parallel to the longitudinal axis.

A suitable controller 28 is supported within the housing and is operatively connected to the motor for controlling the motor. The controller generates suitable control signals for the motor to operate the motor in either one of two opposing directions resulting in the second jaw being displaced longitudinally in two opposing directions relative to the first jaw. The motor typically comprises an electric motor operatively connected to a suitable battery 30 providing electrical power to the motor. The battery 30 is also mounted on the housing 26 such that the clamp device is readily portable and usable in a variety of different environments. The battery 30 is supported on the housing so as to be externally accessible so that the battery can be readily removed and replaced for charging.

The controller 28 is a printed circuit board which includes a computer processor and a memory storing programming instructions thereon which are executable by the processor for performing the various functions of the clamp device as described herein.

The controller is also in communication with a clamp sensor 32 which measures the clamping force being applied by the clamp device to an object being clamped.

In one embodiment, the clamp sensor 32 is a compressor clamp sensor (not shown) situated on the interior clamping face 20 of one of the jaws such that the clamp sensor generates a clamping signal communicated to the controller in which the clamping signal is proportional to and representative of a clamping force applied to an object being clamped between the jaws. The controller receives the damping signal and determines a corresponding clamping force or clamping pressure being applied by the clamp device to an object clamped between the jaws.

Alternatively, the clamp sensor 32 may take the form of a strain gauge mounted at any location along one of the jaws, or along the rail member. The strain gauge measures very small changes in length between two mounting locations along the member of the clamp device along which it is mounted. As clamping pressure upon an object being clamped varies, the rail member and jaws will under some degree of deformation that can be measured by the strain gauge to generate a signal that is proportional to the deformation. The controller 28 receives this signal and calculates the corresponding clamping force using the correlation between deformation and clamping pressure.

A display 34 supported on the housing is also in communication with the controller for displaying the value of the clamping force determined by the controller based on the clamping signal of the clamp sensor 32.

An operator input 36 is also supported on the housing in communication with the controller to receive suitable input commands from an operator to operate the motor and for programming the controller.

The operator input 36 includes a first drive input in the form of a trigger 104 which is readily accessible by the index finger of a user when a handle grip portion of the housing 26 is supported within the hand to grip of a user. The trigger 104 is a pressure sensitive switch which generates an activation signal representing a magnitude which is proportional to the amount of deflection of the trigger in a manner which is comparable to the trigger on a variable speed cordless rotary drill. The inputs 36 also include a second drive input in the focus of a reverse switch 106 which can be positioned in either a forward or reverse position. In the forward position, actuating the trigger 104 causes the clamping heads to be displaced towards one another for clamping an object therebetween; however, in the reverse position of the reverse switch 106, actuating the trigger 104 causes the clamping heads to be displaced away from one another such as when operating the clamping device in a spreading mode of operation.

The operator input 36 also includes a plurality of programming buttons 108 as described in further detail below.

In use, an operator uses the operator input 36 to provide power to the motor to actuate the motor in a selected one of the two opposing directions for moving the second jaw longitudinally relative to the first jaw. When it is desired to clamp an object, the user operates the motor in a selected direction to displace the second jaw towards the first jaw. Continued activation of the motor once the object has been clamped between the first and second jaws increases the torque to the motor and thus increases the applied clamping force to the object between the first and second jaws.

In a first manual mode of operation, the operator simply uses the trigger to move the jaws relative to one another while the sensor 32 produces a signal that can be correlated to a clamping force that is displayed on the display 34. The operator can thus directly set the clamping force at any desired value using the trigger, and then subsequent remove clamping pressure using the reverse switch and the trigger again when the clamping operation is complete.

Alternatively, the operator may press a mode selection input button 107 of the controller which switches the mode of operation of the controller from the manual first mode noted above to an automatic second mode described in the following. Once in the second automatic mode of operation, the clamp device 10 can be used to apply a constant clamping pressure over time under autonomous control by the controller which uses feedback from the sensor 32. In this instance, the operator can again use the trigger to initially displace the jaws relative to one another until a desired clamping pressure as indicated on the display 34 is reached. When the operator ceases applying an input to the controller, the controller is arranged to hold the second jaw at a prescribed spacing relative to the first jaw, and in the event of a clamping force being applied to an object, the controller will maintain actuate the motor to reposition the motor as required to supply sufficient torque to maintain the clamping force applied to the object at a fixed value or within a prescribed range of values.

The automatic mode can be selected at any time. That is, the operator may use the trigger in the manual mode to apply an initial clamping force to the object that is shown on the display, followed by selection of the automatic mode. In this instance, the current prescribed clamping force will be set as target value that the controller seeks to maintain in the automatic mode.

Alternatively, the operator may initial select the automatic mode before clamping the object. In this instance, the operator sets the clamping force by repositioning the jaws relative to one another using the trigger up to the desired clamping force shown on the display. The controller will then automatically set the target value to be the current clamping force from the clamp sensor once the clamping force remains unchanged for a prescribed duration. Any subsequent change of current clamping force as a result of the operator using the trigger will result in the target value being reassigned as the current clamping force. If the clamping force changes over time without any operator input through the trigger, the controller will instead activate the motor to reposition the jaws relative to one another in a manner than maintains the clamping force at the target value or within a prescribed range of the target value.

The operator may choose to operate the clamp device either in the manually controlled first mode or in the automated second mode in which the controller holds the jaws in a manner which applies a clamping force as measured by the clamp sensor 32 which remains at a prescribed set point pressure or within a prescribed threshold range relative to the set point pressure. In either mode, the set point pressure is displayed on the display as the operator attempts to increase or decrease the applied clamping force through the operator input. When the operator ceases any further operator input, the current clamping force determined by the clamping signal from the clamp sensor is programmably set as the set point pressure according to which the controller operates only when in the automatic mode.

In alternative embodiments, the programming buttons may include an up button and a down button (not shown) that can be used to adjust the set point pressure in which the up button increases the magnitude of the set point pressure and the down button decreases the magnitude of the set point pressure.

During the automatic mode, the controller will monitor the clamping signal from the clamp sensor at intervals which may be in a continuous sequence or at spaced apart durations. The timing interval between measurements by the clamp sensor can be programmably adjustable in addition to the value of the set point pressure being programmably adjustable using the programming buttons of the controller.

Once a prescribed value is set as the prescribed set point pressure, the controller can determine a threshold range including upper and lower limits relative to the set point. In the event that shrinkage of the object being clamped occurs, such as in the instance of drying wood for example, resulting in the clamping force as sensed by the clamp sensor falling below the lower limit, the controller will activate the motor to urge the second jaw towards the first jaw so as to increase pressure until the clamping signal indicates that the sensed clamping force has returned to being between the upper and lower pressure limits. Similarly, if the object being clamped were to swell, for example due to increased humidity, resulting in the sensed clamping force exceeding the upper limit, the controller will again activate the motor to vary the clamping force applied by the second jaw against the first jaw until the clamping signal indicates that the sensed clamping force has returned to being between the upper and lower pressure limits.

In some embodiments, a second sensor (not shown) may be provided on an exterior face of one of the jaws facing away from the opposing jaw so that the first and second jaws can be used in a spreading application in which the motor applies an adjustable spreading force to spread apart the two objects. In this instance, the controller operates similarly by receiving a spreading force signal from the second sensor which can be used to determine a set point pressure from which a corresponding threshold range is derived so that the controller can further operate the motor to maintain the spreading force determined by the spreading signal from the second sensor within the corresponding threshold range. Alternatively, when using a strain gauge 32 as shown in the illustrated embodiment, the controller can also use deformation measured by the strain gauge as an input to correlate deformation to spreading force so that the strain gauge 32 provides both functions of a clamp sensor to measure clamping force and a second sensor to measure spreading force.

In each embodiment, a docking station 200 is provided for supporting the clamp device relative to a suitable supporting surface such as a table top, counter or other suitably rigid and supporting structure. The docking station in each instance includes a base 202 having a flat bottom surface 204 which is adapted to be secured to the supporting surface. A plurality of mounting flanges 206 protrude from the base about the periphery thereof in a common plane which the bottom surface 204 which locate fastener apertures therein to allow the base 202 to be fastened in fixed relation with the bottom surface 204 flat against the supporting surface.

The base 202 supports a receiving cradle 208 thereon which releasably mates with a portion of the clamp device such that one of the first and second jaws is held in fixed relation to the base. When the housing 26 is shaped according to the illustrated embodiments such that there is a grip handle 210 which is generally cylindrical about an upright axis so as to be suitable for gripping in one hand of the user, the receiving cradle 208 is shaped to form two opposing supporting faces 212 which meet with or abut against respective ones of two opposing side faces 214 of the housing 26 at a location above and longitudinally forward of the grip handle 210 when the trigger 104 is defined at the front side of the grip handle. More particularly the two supporting faces 212 are laterally opposed relative to one another and face inwardly towards one another to define a trough therebetween oriented generally in the longitudinal direction of the rail of the clamping assembly. The supporting faces 212 are tapered it downwardly and inwardly towards one another while remaining spaced apart along the height thereof for meeting with the orientation of the corresponding side faces 214 of the housing 26.

The base 202 further comprises a bottom plate 216 at the bottom side of the base which includes a pocket 218 formed therein that receives the bottom end of the grip handle 210 therein when an upper portion of the housing 26 is received within the cradle 208 which is positioned upwardly and forwardly in relation to the bottom plate 216. The base also includes a riser portion 220 extending upwardly from the bottom of the base at a location forwardly of the bottom plate 216 to a top end supporting the upper portion of the housing 26 within the cradle 208 of the base. In a mounted position of the housing 26 within the docking station, the riser 220 remains spaced forwardly of the grip handle to provide access for the end of the user therebetween, and more particularly to provide access to the index finger of the user to reach and actuate the trigger 104.

To retain the housing 26 in a docked configuration within the docking station, a spring retainer mechanism 222 is mounted within the base 202 at each of the supporting faces 212 for cooperation with respective sockets 224 formed in the side faces 214 of the housing 26. Each spring retainer mechanism comprises a threaded bolt which is threaded into a respective bore within the base 202 which is open at the respective supporting face 212 of the cradle 208. The bolt includes a hollow chamber therein which receives a spring, and a bearing which is urged by the spring two protrude beyond the end of the bolt and beyond the plane of the respective supporting face 212 two protrude into the respective socket 224 in the mounted position of the housing 26 within the docking station. An annular rim at the inner end of the bolt prevents the bearing member from being removed from the hollow chamber within the bolt however the bearing is movable axially into the housing of the bolt against the spring. Insertion of the housing into the docking station causes the side surfaces of the housing to urge the spring retainer mechanisms to retract in non-protruding relationship relative to the supporting faces 212 until the housing reaches a fully docked position relative to the base 202. Once the bearings of the retainer mechanisms become aligned with the respective sockets 224, the spring biases the bearing two protrude across a plane of the supporting face 212 and the plane of the corresponding side face of the housing 26 locating the socket therein to restrict removal of the housing from the base until a sufficient force is applied to deflect the bearings against the spring force and return the retainer mechanisms into a released position.

Figure 2:
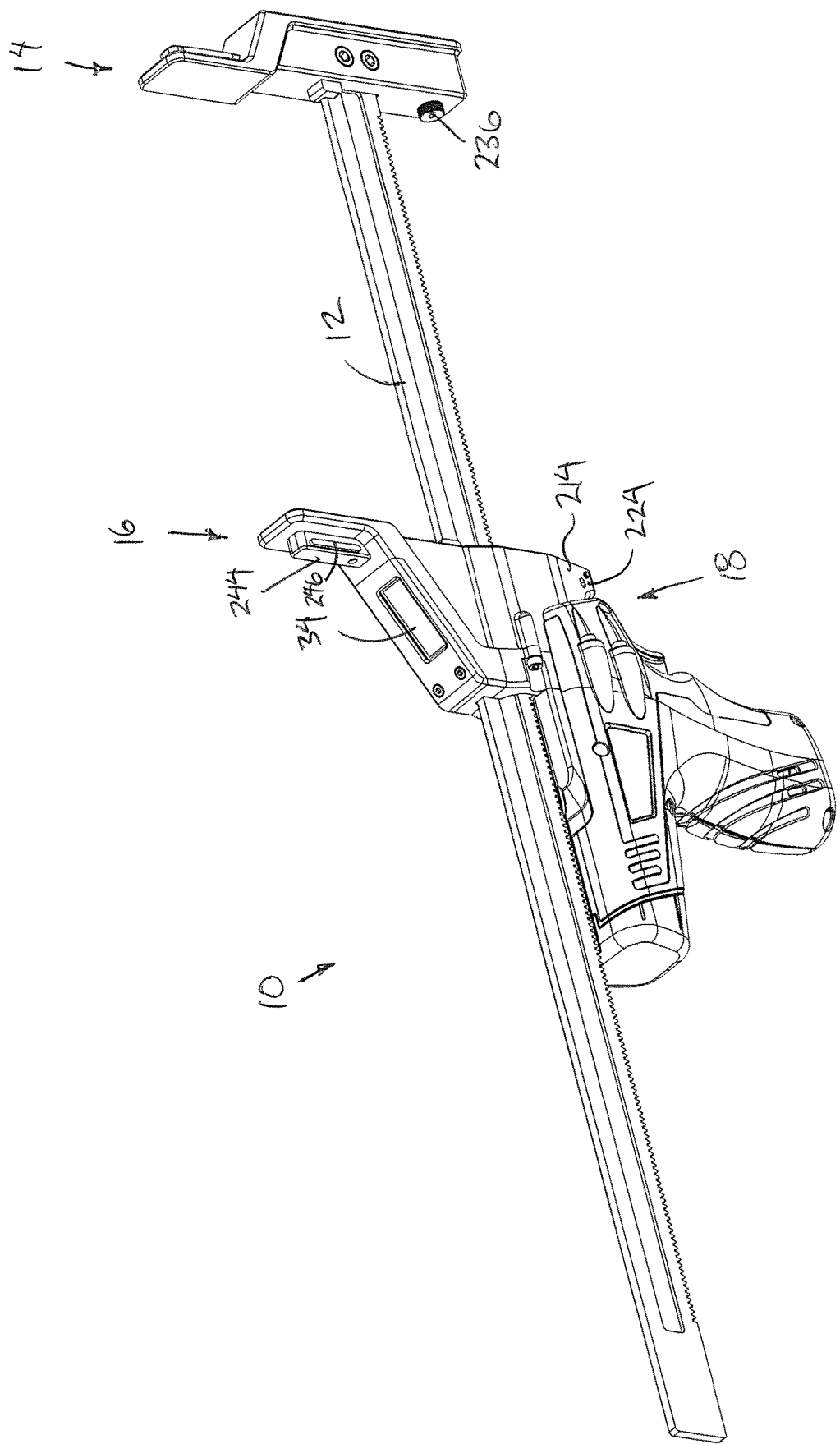
FIGS. 2 and 3 are additional perspective views of the clamp device according to the first embodiment of FIG. 1.
Figure 3:
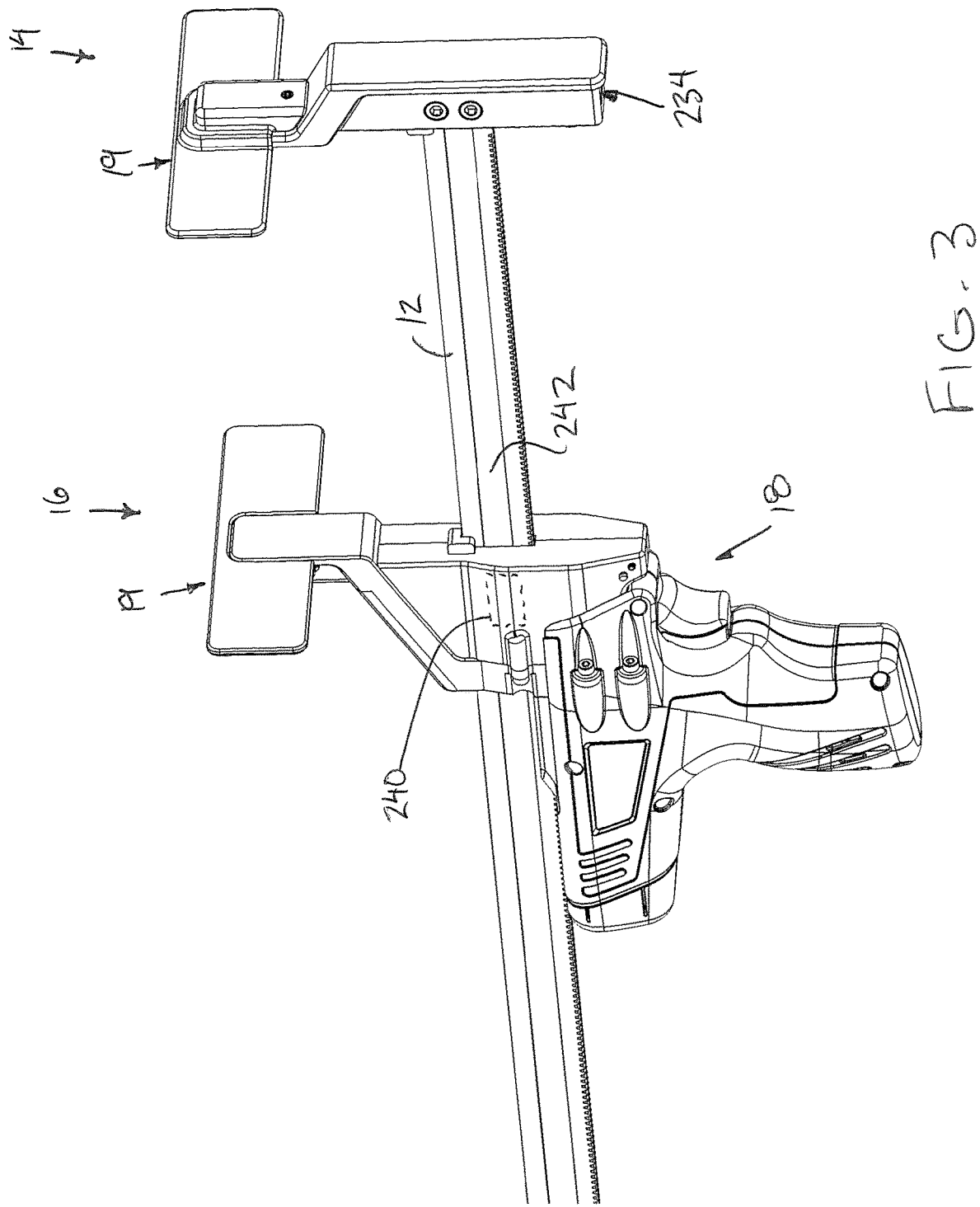
Figure 4:
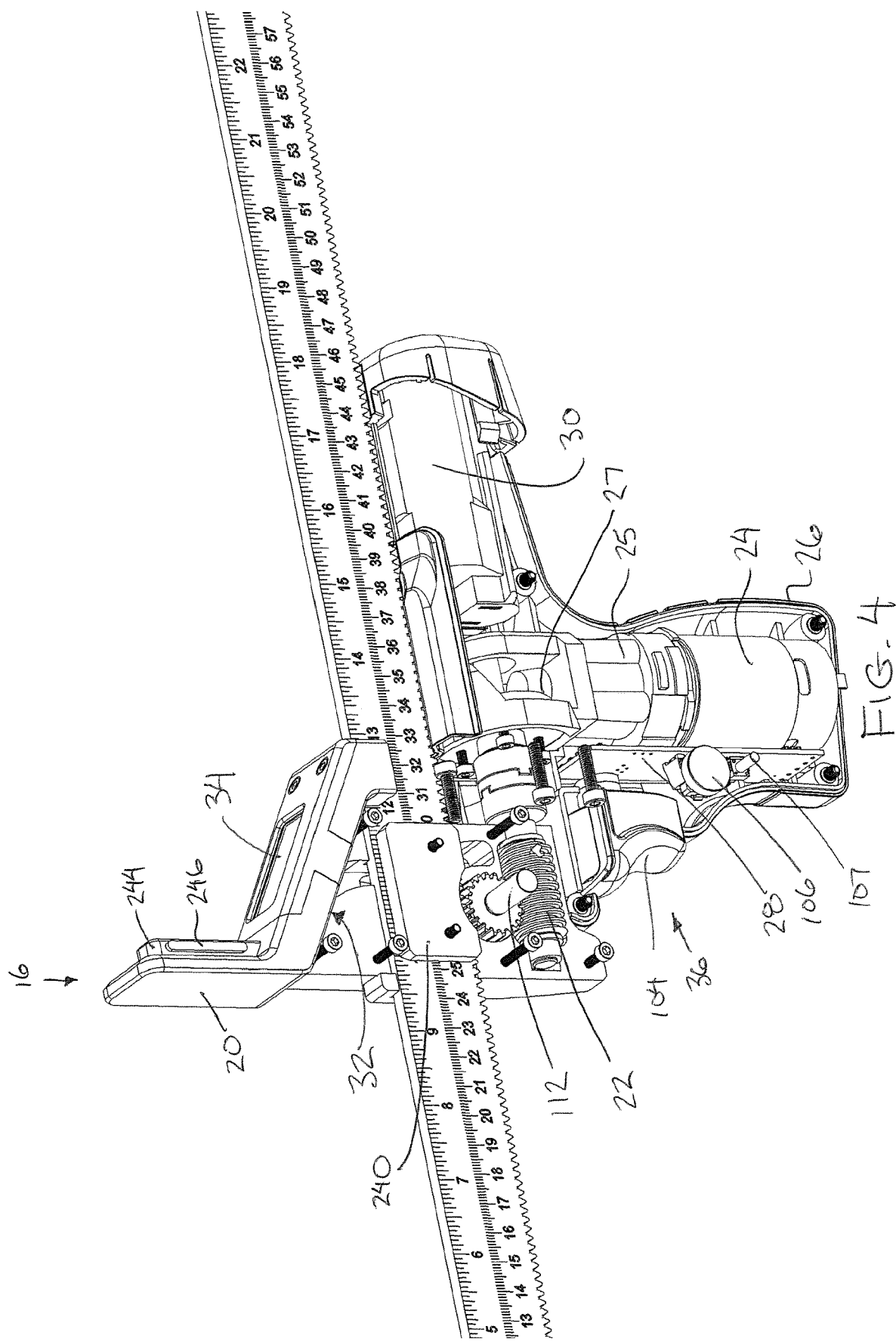
FIG. 4 is a partly sectional view of the clamp assembly of the clamp device according to the first embodiment of FIG. 1.
Figure 6:
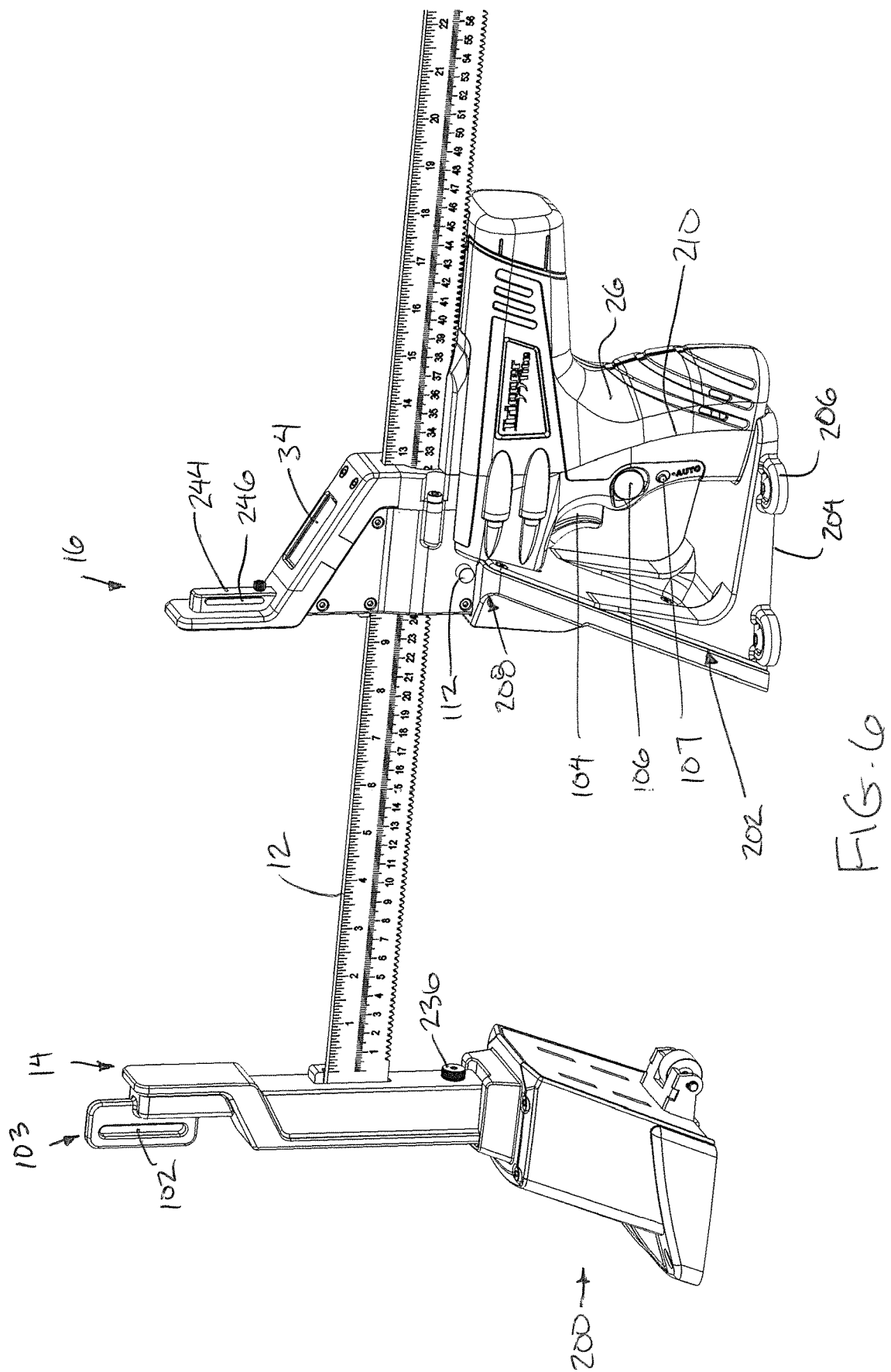
Figure 13:
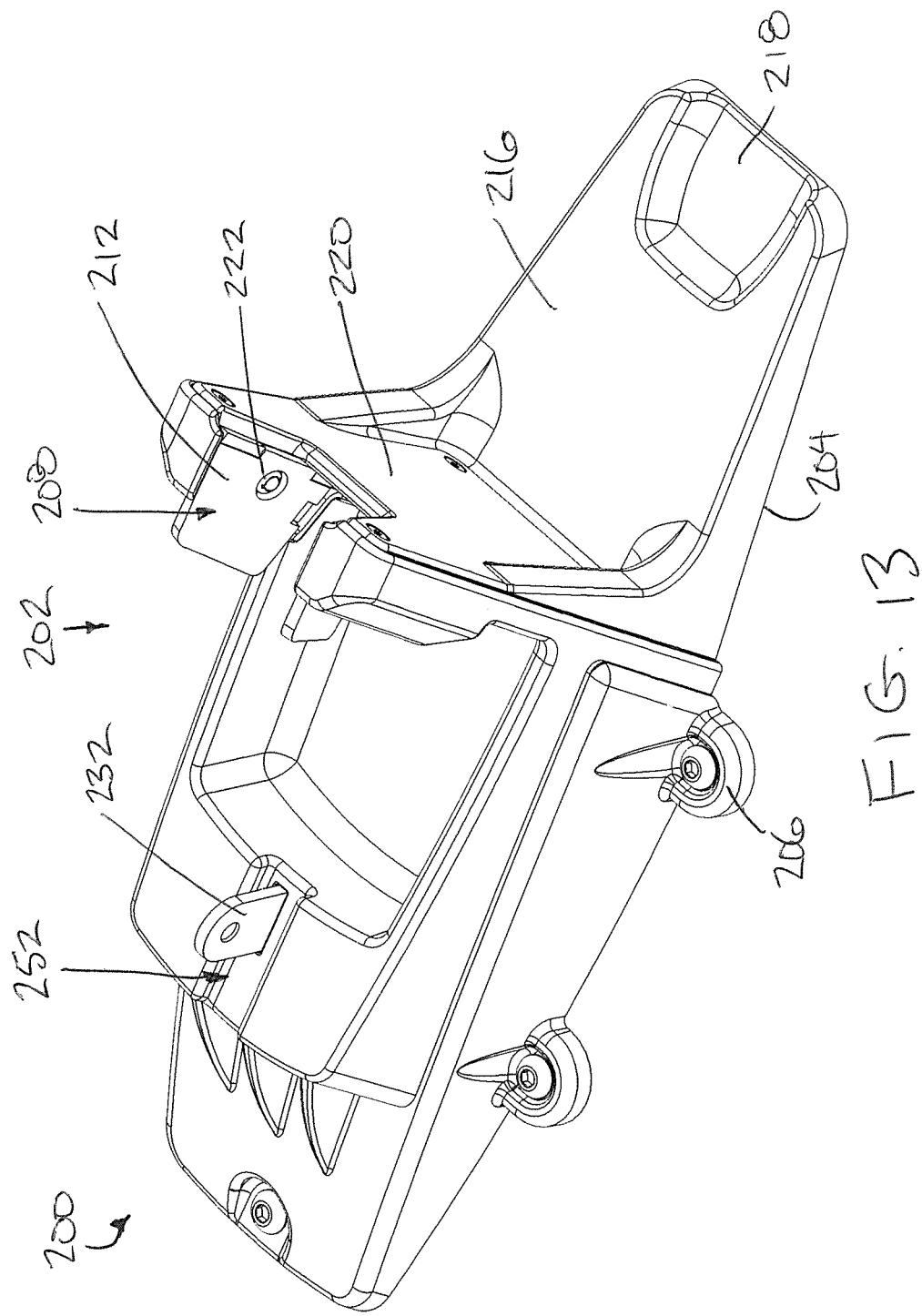
FIG. 13 is a perspective view of a docking station for the clamp device according to the second embodiment of FIG. 9.

Turning now to the first embodiment of FIGS. 1 through 9, in this instance the second jaw 16 is supported on the housing 26 that supports the motor and controller therein in which the housing is movable together with the second jaw for sliding movement longitudinally along the rail member. A rack of gear teeth 40 is provided along one side of the rail member in this instance while the screw is oriented so that the longitudinal axis is parallel to the longitudinal axis of the rail member. A spur gear 42 is rotatably supported on the housing in operative connection between the screw member 22 and the rack of gear teeth 40 so that rotation of the screw member by the motor will cause rotation of the spur gear which in turn displaces the housing along the rail member by interaction of the spur gear with the gear teeth 40. When using a compressive clamp sensor, the sensor in this instance is typically located on the faces of the second jaw so that the clamp sensors are in fixed relation to the housing locating the controller therein as shown in FIG. 4. Alternatively, when using a strain gauge that measures deformation, the sensor can be located anywhere on the fixed jaw.

As illustrated in the embodiment of FIGS. 1 through 7, the spur gear 42 can be supported for axial sliding movement along an axis of the spur gear between (i) an engaged position in which the spur gear is in meshing engagement with both the teeth 40 on the rail member 12 and the threads on the screw 22 for transmitting drive from the motor 24 to the rail member 12, and (ii) a disengaged position in which the spur gear is axially displace relative to the engaged position so as to be disengaged with one or both of the teeth 40 on the rail member and the threads of the screw 22. A button 112 is mounted externally on the housing 26 in connection with the axle of the spur gear so that depressing the button will displace the spur gear into the disengaged position to allow manual sliding of the rail member 12 relative to the housing 26 independent of the motor operation. A spring (not shown) will bias the spur gear into the engaged position, so that the rail member 12 moves according to operation of the motor when the button 112 is not pressed.

In the first embodiment, the docking station 200 is adapted to receive the housing 26 therein such that the second jaw is mounted in fixed relation to the base 202. The docking station in this instance further comprises a roller carriage 226 which is supported for rolling movement along the same supporting surface that the base 202 is fixedly coupled to when the roller carriage 226 is fixedly coupled to the first jaw and the first shot is displaced relative to the second jaw. More particularly, the roller carriage 226 comprises a housing having a flat bottom supported on wheels 228 oriented for rolling movement in the longitudinal direction of the rail member when coupled to the first jaw. An upper mount at the top end of the roller carriage housing comprises a stem 230 which extends upwardly in perpendicular relationship to the flat bottom. The stem 230 is sized and shaped to extend upwardly into a socket 234 formed at the bottom side of the first jaw of the clamp device in meeting relationship therewith. A transverse bore is formed into the body of the first jaw in alignment with the socket 234 which is threaded to receive a set screw 236 threaded therein in alignment with the socket. Once the stem 232 is inserted into the socket, tightening of the set screw effectively groups and retains the stem within the socket to fixedly couple the roller carriage 226 relative to the body of the first jaw. In this manner the roller carriage is movable together with the first jaw relative to the housing 26 that supports the second jaw thereon mounted on the base of the docking station.

The components of the docking station are shaped relative to one another so as to not interfere with displacement of the first jaw relative to the second jaw into a fully clamped position with the jaws abutted against one another. For example, when one of the wheels 228 protrudes rearwardly from the housing of the roller carriage 226 towards the base 202, as shown in the illustrated embodiment, the base may include a suitable recess 238 that receives the wheel therein in the fully clamped position of the jaws.

A pair of guide blocks 240 are mounted internally within the upper portion of the housing for engagement against opposing sides of the rail member in which the guide blocks are formed of a material having a low coefficient of friction for ease of sliding of the rail member through the housing 26. One of the guide blocks 240 is preferably shaped to be at least partly received within a longitudinally extending groove 242 in one of the side faces of the rail member. The groove 242 is closed at both ends such that longitudinal sliding of a portion of one of the guide blocks 240 within the longitudinal groove defines the limits of travel of the rail member relative to the housing 26.

As described above, various forms of the auxiliary clamping heads 103 may be interchanged with the clamping heads 19 shown in FIGS. 1 and 3. In each instance, the body of the clamping jaw defines an upright rail 244 with protruding ridges 246 at laterally opposing sides thereof such that an upper mounting portion of each clamping jaw body as a uniform cross-sectional shape along a height thereof so as to enable a channel 248 on each clamping head to be formed with a mating cross-sectional shape to enable meeting of the clamping head onto the upper mounting portion of the clamping job body in a manner that allows sliding movement of the clamping head between a mounted position and a released position removed from the job. The sliding axis is oriented perpendicularly to the clamping direction defined by the rail member. A suitable set screw 250 is threaded into the clamping head in alignment with the mounting portion of the body of the jaw in the usual manner of the operation of a set screw to selectively retain the clamping head mounted on the jaw.

As shown in FIG. 2, each jaw includes a respective clamping face at the inner side thereof which is parallel to the opposing clamping face and perpendicular to the longitudinal direction of the rail member for clamping an object between the clamping faces. In the embodiment of FIG. 1, auxiliary clamping heads 103 are provided which provide lateral extensions of the clamping face on the jaw by providing a much wider clamping face can be used in various applications. Alternatively, alternative clamping heads 103 according to the embodiment of FIG. 8 may be provided in which the clamping faces of each clamping head face away from the opposing job while the clamping faces remain parallel to one another so as to be suited for a spreading application. In yet a further configuration as shown in FIG. 9, the clamping heads in this instance may be provided with slots 102 formed therein so as to be suitable for receiving opposing ends of the strap 100 therein in which the strap can be used for constricting about the diameter of an object to be clamped as described above.

Turning now to the second embodiment of FIGS. 10 through 14, in this instance the housing that receives the motor and controller therein is mounted in fixed relation on the second end of the rail member. In this instance the housing supports a second rail member 44 thereon for longitudinal sliding movement at a location parallel and spaced from the rail member supporting the first jaw thereon. The second jaw is supported at an inner end of the second rail 44 so that the first and second jaws are movable relative to one another at the second rail is displaced relative to the housing. The motor in this instance is again used for driving rotation of the screw with the screw being optionally located in direct meshing engagement with a rack of gear teeth along the second rail 44. As shown in FIG. 7, an additional pair of spur gears 110 may be operatively connected between the output of the right-angle gear set 27 and the screw 22 to provide some additional clearly between the right-angle gear set 27 and the second rail 44. When using a compressive clamp sensor, the sensor in this instance is typically located on the first jaw so that the clamp sensor is in fixed relation to the housing that locates the controller therein. Alternatively, when using a strain gauge that measures deformation, the sensor can be located on either one of the rail member or the fixed jaw.

In the embodiment of the FIGS. 10 through 14, the docking station 200 in this instance is formed of a single housing defining the base 202 which mounts the housing 26 of the clamping assembly thereon such that the first jaw is supported in fixed relation to the base. In this instance the housing of the base 202 locates a second cradle portion 252 thereon at a location extending forwardly of the riser 226 opposite from the bottom plate 216. In this instance, when the handle grip of the housing 26 is received within the receiving cradle 208 with the bottom of the handle grip within the socket of the bottom plate 216, the rail member is partly received in and supported by the second cradle 252 protrude and forwardly from the riser. A similar stem 232 is mounted on the base 202 at the location of the second cradle 252 such that the stem is aligned with and received into a socket 234 which in this instance is formed in the bottom side of the rail member in proximity to the first jaw. A set screw 236 is mounted within a threaded bore in the side of the rail member in alignment with the socket 234 for selectively engaging the stem 232 and retaining the rail member in fixed relation to the second cradle portion 252 of the base.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A clamp device comprising:
a rail member which is elongate in a longitudinal direction;
a first jaw adapted to be mounted on the rail member in fixed relation to the rail member;
a second jaw;
a clamp assembly supporting the second jaw on the rail member such that the second jaw is movable along the rail member in the longitudinal direction relative to the first jaw for clamping an object between the first and second jaws;
a clamp sensor operatively connected to one of the jaws and arranged to generate a time sequence of clamping force signals over a duration of time in which each clamping force signal is representative of a clamping force at a respective moment in time that is applied by the first and second jaws to said object between the first and second jaws;
a motor operatively connected to the clamp assembly so as to be arranged to drive movement of the second jaw in the longitudinal direction relative to the rail member; and
a controller operatively connected to the clamp sensor and the motor, the controller including a processor and programming stored thereon which is executable by the processor so as to be arranged, subsequent to each clamping force signal being generated by the clamp sensor with said sequence of clamping force signals, to operate the motor to maintain the clamping force signal measured by the clamp sensor within a prescribed threshold range and thereby apply a constant clamping force between the first and second jaws throughout said duration of time in an automatic mode of operation.

2. The clamp device according to, claim 1 further comprising a display supported on the clamp device and which is operatively connected to the clamp sensor so as to be arranged to display a value proportional to the clamping force signal which is representative of the clamping force between the first and second jaws.

3. The device according to claim 1 wherein the controller is arranged to execute the programming so as to actuate the motor to drive movement of the second jaw relative to the first jaw only if the clamping force sensed by the clamp sensor is outside of the threshold range of clamping force.

4. The device according to claim 1 wherein the controller and the motor are supported within a common hand-held housing and wherein the prescribed threshold range is programmably adjustable using activation buttons supported on the common hand-held housing.

5. The device according to claim 1 wherein the controller includes (i) at least one drive input operable to manually activate the motor to displace the jaws relative to one another to vary a current clamping force that is currently sensed by the clamp sensor as being applied by the jaws in a manual mode of operation and (ii) a mode selection input operable to activate the automatic mode of operation from the manual mode of operation, the controller being further arranged to set the prescribed threshold range based on the current clamping force in response to the automatic mode of operation being activated.

6. The device according to claim 1 wherein the the clamping force signals of said time sequence are continuous with one another and the controller is arranged to monitor the clamping force signals of said time sequence continuously.

7. The device according to claim 1 wherein the controller is arranged to monitor the clamping force signals of said time sequence at intervals of time that are spaced apart in duration from one another.

8. The device according to claim 1 wherein the clamp sensor is further arranged to generate a spreading signal representative of a spreading force urging the first and second jaws away from one another.

9. The device according to claim 1 wherein the clamp assembly comprises a screw which is operatively connected to the motor for driving movement of the second jaw relative to the first jaw.

10. The device according to claim 9 wherein the clamp assembly further comprises a rack of teeth along the rail member with which the screw is operatively connected for driving movement of the second jaw relative to the first jaw.

11. The device according to claim 10 wherein the clamp assembly further comprises a spur gear operatively connecting the screw to the rack of teeth.

12. The device according to claim 1 wherein the clamp sensor comprises a strain gauge operatively connected to one of the jaws.

13. The device according to claim 1 further comprising a docking station having a base which is adapted to be secured to a supporting surface in fixed relation therewith and a receiving portion which releasably mates with a portion of the clamp device such that one of the first and second jaws is held in fixed relation to the base.

14. The device according to claim 13 wherein the clamp device comprises a bar clamp in which the second jaw is adapted to be coupled in fixed relation to the base such that the first jaw and the rail member are movable relative to the base, and wherein the docking station further comprises a carriage member adapted to be mounted in fixed relation to the first jaw and which is supported for rolling movement along the supporting surface that supports the base in fixed relation thereon.

15. The device according to claim 1 further comprising a first clamping head supported on the first jaw and a second clamping head supported on the second jaw so as to define respective clamping faces of the first and second jaws which clamp an object therebetween, the first and second clamping heads being mounted on the jaws so as to be interchangeable with auxiliary clamping heads having respective clamping faces which are different in configuration than the clamping faces of the first and second clamping heads.

16. The device according to claim 1 further comprising a first clamping head supported on the first jaw and a second clamping head supported on the second jaw so as to define respective clamping faces of the first and second jaws which clamp an object therebetween, the first and second clamping heads being adjustably mounted on the jaws so as allow variation of a distance of the clamping faces relative to the rail member in a direction transverse to the longitudinal direction.

17. The device according to claim 1 further comprising a second sensor operatively connected to the controller so as to generate a spreading signal representative of a spreading force urging the first and second jaws away from one another and wherein the controller is arranged to operate the motor to displace the second jaw relative to the first jaw so as to maintain the spreading signal measured by the clamp sensor within a prescribed threshold range to apply a constant spreading force between the first and second jaws.

18. The device according to claim 1 further comprising:
a housing commonly supporting the motor and the controller therein, the housing including a grip portion arranged to be gripped in one hand of a user;
a trigger switch supported on the housing so as to be arranged to be readily accessible by an index finger of the user when the grip portion is gripped in the hand of the user;
the trigger comprising a pressure sensitive switch arranged to generate an activation signal representing a magnitude which is proportional to an amount of deflection of the trigger switch by the user; and
the motor being operable to drive movement of the second jaw relative to the rail member responsive to the magnitude represented by the activation signal.

19. The device according to claim 1 further comprising:
a housing commonly supporting the motor and the controller therein, the housing including a grip portion arranged to be gripped in one hand of a user;
a trigger switch supported on the housing so as to be arranged to be readily accessible by an index finger of the user when the grip portion is gripped in the hand of the user;
a directional switch on the housing so as to be movable between a first position and a second position;
the motor being operable to drive movement of the second jaw relative to the rail member in a first direction responsive to activation of the trigger switch in the first position of the directional switch; and
the motor being operable to drive movement of the second jaw relative to the rail member in a second direction responsive to activation of the trigger switch in the second position of the direction switch.

20. A clamp device comprising:
a rail member which is elongate in a longitudinal direction;
a first jaw adapted to be mounted on the rail member in fixed relation to the rail member;
a second jaw;
a clamp assembly supporting the second jaw on the rail member such that the second jaw is movable along the rail member in the longitudinal direction relative to the first jaw for clamping an object between the first and second jaws;
a clamp sensor operatively connected to one of the jaws so as to generate a clamping signal representative of a clamping force urging the first and second jaws towards one another;
a display supported on the clamp device and which is operatively connected to the clamp sensor so as to be arranged to display a value proportional to the clamping signal which is representative of the clamping force between the first and second jaws;
a docking station having (i) a base which is adapted to be secured to a supporting surface in fixed relation therewith and (ii) a receiving portion which releasably mates with a portion of the clamp device such that one of the first and second jaws is held in fixed relation to the base;
wherein the clamp device comprises a bar clamp in which the second jaw is adapted to be coupled in fixed relation to the base such that the first jaw and the rail member are movable relative to the base; and
wherein the docking station further comprises a carriage member adapted to be mounted in fixed relation to the first jaw and which is supported for rolling movement along the supporting surface that supports the base in fixed relation thereon.

* * * * *